(12) United States Patent
Kuehner et al.

(10) Patent No.: US 12,060,105 B2
(45) Date of Patent: Aug. 13, 2024

(54) SYSTEMS AND METHODS FOR VISUAL CUES ON A STEERING APPARATUS

(71) Applicant: Toyota Research Institute, Inc., Los Altos, CA (US)

(72) Inventors: Manuel Ludwig Kuehner, Mountain View, CA (US); Hiroshi Yasuda, San Francisco, CA (US); Scott Michael Harris, San Jose, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 310 days.

(21) Appl. No.: 17/713,586

(22) Filed: Apr. 5, 2022

(65) Prior Publication Data

US 2023/0311989 A1 Oct. 5, 2023

(51) Int. Cl.
*B62D 15/02* (2006.01)
*B62D 1/04* (2006.01)

(52) U.S. Cl.
CPC ............. *B62D 15/029* (2013.01); *B62D 1/04* (2013.01)

(58) Field of Classification Search
CPC ........ B62D 15/029; B62D 1/04; B62D 1/046; B62D 15/02; B60K 35/00
See application file for complete search history.

(56) References Cited

U.S. PATENT DOCUMENTS

| | | | |
|---|---|---|---|
| 7,414,520 B2 | 8/2008 | Meißner | |
| 7,605,693 B2 | 10/2009 | Kulas | |
| 7,605,694 B2 | 10/2009 | Prost-Fin et al. | |
| 7,679,495 B2 | 3/2010 | Beutnagel-Buchner et al. | |
| 9,248,851 B2 | 2/2016 | Van'tZelfde et al. | |
| 9,481,297 B2 | 11/2016 | Salter et al. | |
| 9,937,948 B2 | 4/2018 | Oh et al. | |
| 11,554,716 B1 * | 1/2023 | Yasuda ................... | B60Q 3/80 |
| 2011/0187518 A1 | 8/2011 | Strumolo et al. | |
| 2014/0109719 A1 | 4/2014 | Lisseman et al. | |
| 2017/0144688 A1 | 2/2017 | Pitzer | |
| 2019/0016383 A1 | 1/2019 | Spencer et al. | |
| 2021/0039715 A1 | 2/2021 | Ferrer et al. | |

FOREIGN PATENT DOCUMENTS

| | | | | |
|---|---|---|---|---|
| CA | 2871361 A1 * | 11/2013 | ........... | B60Q 1/0082 |
| CN | 100422025 C * | 10/2008 | ............ | B62D 1/046 |
| DE | 102017100005 A1 * | 7/2018 | ............ | B60Q 3/283 |
| EP | 3630583 B1 * | 3/2021 | ............ | B60K 35/00 |
| FR | 2744976 A1 * | 8/1997 | ............ | B60K 35/00 |
| KR | 20130021984 A * | 3/2013 | | |
| WO | WO-2018215439 A1 * | 11/2018 | ............ | B60K 35/00 |

\* cited by examiner

*Primary Examiner* — Hung Q Nguyen

(74) *Attorney, Agent, or Firm* — Christopher G. Darrow; Darrow Mustafa PC

(57) ABSTRACT

System, methods, and other embodiments described herein relate to providing visual cues on a steering apparatus of a vehicle. In one embodiment, a method includes determining a difference between a current angle of a steering apparatus of a vehicle and a recommended angle of the steering apparatus. The method further includes illuminating a region of a grip of the steering apparatus based upon the difference and a position of a hand of an operator of the vehicle on the grip. The method additionally includes unilluminating the region as the steering apparatus is rotated from the current angle to the recommended angle.

20 Claims, 9 Drawing Sheets

SYSTEMS AND METHODS FOR VISUAL CUES ON A STEERING APPARATUS

TECHNICAL FIELD

The subject matter described herein relates, in general, to providing assistance to an operator of a vehicle, and, more particularly, to providing visual cues on a steering apparatus of the vehicle.

BACKGROUND

A vehicle may be equipped with systems that provide an operator of the vehicle with driving instructions. For instance, the driving instructions may enable the vehicle to follow a route and/or the driving instructions may enable the vehicle to avoid an obstacle as the vehicle navigates about an environment. Conventional systems for providing driving instructions may present information to the operator in a manner that distracts the operator from looking at the road, such as when such instructions are presented on a dashboard or a center console of the vehicle. Additionally, conventional systems tend to be deficient with respect to communicating precise driving instructions to the operator of the vehicle.

SUMMARY

An example visual cue assistance system for communicating a steering angle change through visual cues on a steering apparatus is described herein. In one embodiment, the visual cue assistance system selectively activates lighting elements disposed within a grip of a steering apparatus, where a number of lighting elements activated is based upon a difference between a current angle of a steering apparatus and a recommended angle of the steering apparatus. The lighting elements may be located proximate to a hand of the operator on the grip. The visual cue assistance system progressively deactivates the lighting elements as the steering apparatus is rotated from the current angle to the recommended angle to indicate to the operator that the steering apparatus is being rotated towards the recommended angle. Thus, the visual cue assistance system is able to visually inform the operator of a precise maneuver change without overwhelming the operator and without distracting the operator from observing an environment around the vehicle.

In one embodiment, a computing system for providing visual cues on a steering apparatus of a vehicle is disclosed. The computing system includes one or more processors and a memory communicably coupled to the one or more processors. The memory stores instructions that when executed by the one or more processors cause the one or more processors to determine a difference between a current angle of the steering apparatus and a recommended angle of the steering apparatus. The instructions further cause the one or more processors to illuminate a region of a grip of the steering apparatus based upon the difference. The region is located proximate to a hand of an operator of the vehicle on the grip. The instructions further cause the one or more processors to unilluminate the region as the steering apparatus is rotated from the current angle to the recommended angle.

In one embodiment, a non-transitory computer-readable medium for providing visual cues on a steering apparatus of a vehicle and including instructions that when executed by one or more processors cause the one or more processors to perform one or more functions is disclosed. The instructions cause the one or more processors to determine a difference between a current angle of the steering apparatus of the vehicle and a recommended angle of the steering apparatus. The instructions further cause the one or more processors to illuminate a region of a grip of the steering apparatus based upon the difference. The region is located proximate to a hand of an operator of the vehicle on the grip. The instructions further cause the one or more processors to unilluminate the region as the steering apparatus is rotated from the current angle to the recommended angle.

In one embodiment, a method for providing visual cues on a steering apparatus of a vehicle is disclosed. The method includes determine a difference between a current angle of a steering apparatus of a vehicle and a recommended angle of the steering apparatus. The method further includes illuminate a region of a grip of the steering apparatus based upon the difference and a position of a hand of an operator of the vehicle on the grip. The method further includes unilluminate the region as the steering apparatus is rotated from the current angle to the recommended angle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
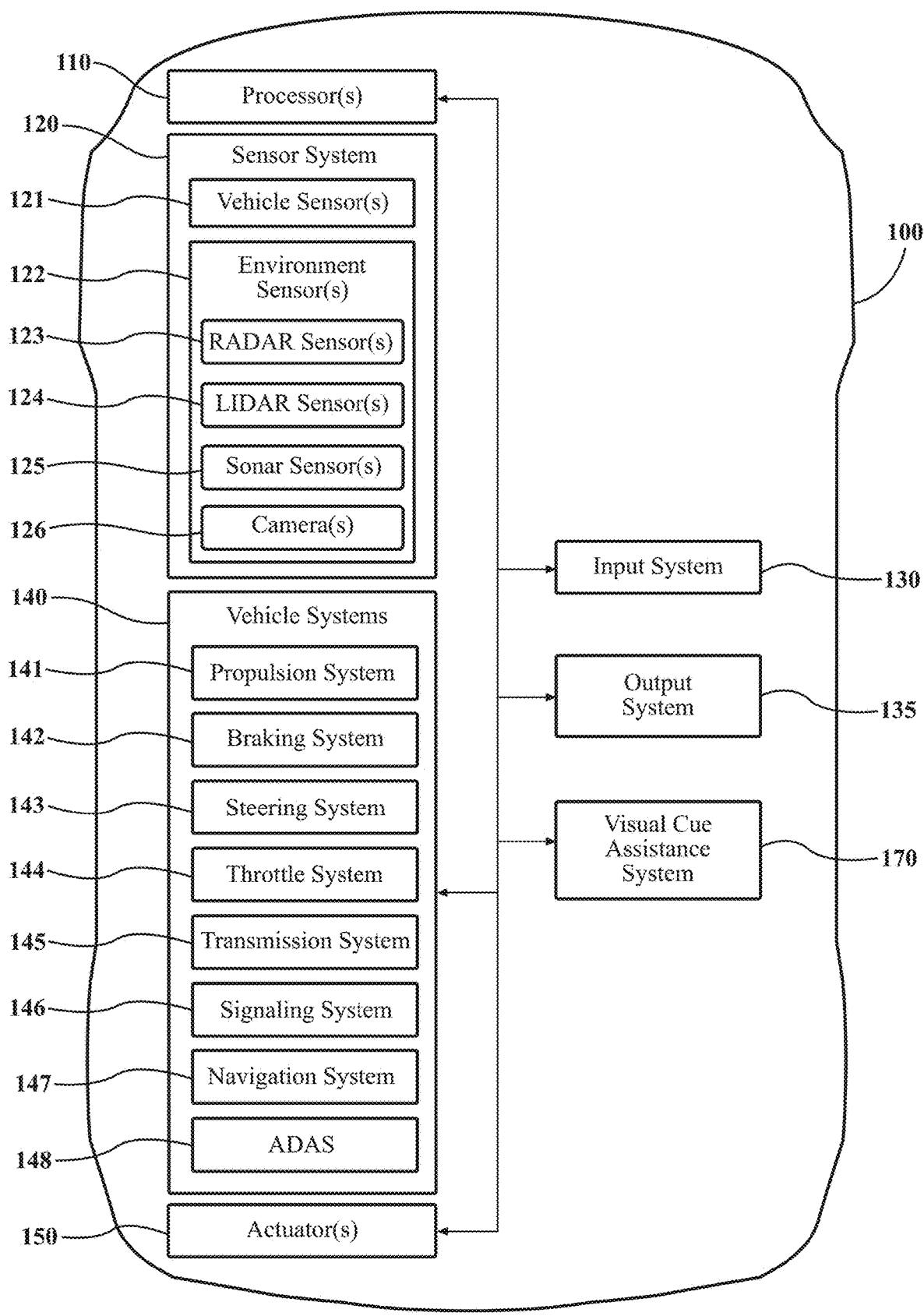
FIG. 1 illustrates one embodiment of a vehicle within which systems and methods disclosed herein may be implemented.

Systems, methods, and other embodiments associated with improving visual cues provided to an operator of a vehicle are disclosed herein. As noted above, conventional systems for providing driving instructions to an operator of a vehicle tend to struggle between providing precise driving instructions to the operator while at the same time presenting the driving instructions to the operator in an easily understandable manner. Furthermore, conventional systems may present driving instructions in a distracting manner. Additionally, some conventional systems may provide steering wheel torque to indicate a driving instruction (i.e., a recommended steering action). Providing steering wheel torque to indicate a driving instruction can potentially influence a trajectory of the vehicle, and hence may be undesirable in certain scenarios, such as when the driving instruction is incorrect.

Therefore, in an embodiment, a visual cue assistance system is disclosed that provides visual cues for navigation and/or obstacle avoidance purposes to an operator of a vehicle, where the visual cues are provided on a steering apparatus of the vehicle. The visual cue assistance system determines a current angle of the steering apparatus based upon sensor data output from a steering angle sensor operatively coupled to the steering apparatus. The visual cue assistance system may receive a recommended direction from a navigation system and/or an advance driver-assistance system (ADAS) of the vehicle. In an example, the navigation system obtains sensor data (e.g., LIDAR data, RADAR data, SONAR data, camera images, etc.) output from one or more sensors of the vehicle, where the sensor data is indicative of an environment around the vehicle. The navigation system determines the recommended direction based upon the sensor data and provides the recommended direction to the visual cue assistance system. The visual cue assistance system converts the recommended direction into a recommended angle for the steering apparatus. In another example, the visual cue assistance system obtains the sensor data output from the one or more sensors of the vehicle. The visual cue assistance system determines the recommended angle based upon the sensor data. In an example, the recommended angle enables the vehicle to follow a predetermined route to a destination and/or the recommended angle enables the vehicle to avoid a collision with an obstacle (e.g., another vehicle) in the environment of the vehicle. In another example, the recommended angle enables the vehicle to park in a parking space. The visual cue assistance system determines a difference between the current angle of the steering apparatus and the recommended angle of the steering apparatus. In an example, the difference is 30° clockwise.

The visual cue assistance system illuminates a region of a grip of the steering apparatus based upon the difference. The region may be located proximate to a hand of an operator of the vehicle on the grip. For instance, in an embodiment, the grip of the steering apparatus has a plurality of lighting elements disposed therein. In an example, the steering apparatus has thirty-six lighting elements disposed radially (e.g., in a circular or substantially circular pattern) throughout the grip of the steering apparatus, where each lighting element represents 10°. The steering apparatus also has one or more hand position sensors. The hand position sensors output sensor data that is indicative a position of one or more hands of the operator on the grip of the steering apparatus. The visual cue assistance system determines a position of a hand of the operator on the grip of the steering apparatus based upon the sensor data. The visual cue assistance system selects a subset of lighting elements in the plurality of lighting elements based upon the difference and the position of the hand of the operator on the grip. The visual cue assistance system illuminates the subset of lighting elements, where the subset of lighting elements correspond to the region. In an example in which the steering apparatus has thirty-six lighting elements and the difference between the current angle and the recommended angle of the steering apparatus is 30° clockwise, the visual cue assistance system illuminates a first lighting element, a second lighting element, and a third lighting element disposed within the grip, where the first lighting element is located proximate and clockwise from the hand of the operator on the grip, the second lighting element is located proximate and clockwise from the first lighting element, and the third lighting element is located proximate and clockwise from the second lighting element. According to embodiments, the visual cue assistance system may additionally inform the operator of the difference using other sensory means, such as haptic feedback within the steering apparatus, thermal feedback within the steering apparatus, and/or audible feedback.

The visual cue assistance system unilluminates the region of the grip of the steering apparatus as the steering apparatus is rotated by the operator from the current angle to the recommended angle. Following the example given above in which the first lighting element, the second lighting element, and the third lighting element are illuminated to illustrate the difference, the visual cue assistance system unilluminates the third lighting element when the steering apparatus is rotated 10° from the current angle (now referred to as the "original angle" for clarity). Subsequently, the visual cue assistance system unilluminates the second lighting element when the steering apparatus is rotated 20° from the original angle. Subsequently, the visual cue assistance system unilluminates the first lighting element when the steering apparatus is rotated 30° from the original angle. Thus, through progressive unillumination of the third lighting element, the second lighting element, and the first lighting element as the steering apparatus is rotated to the recommended angle, the visual cue assistance system visually informs the operator of a direction and degree to which the steering apparatus is to be rotated.

The visual cue assistance system described above presents various improvements over conventional systems that provide driving instructions to an operator of a vehicle. First, as the visual cue assistance system provides visual cues on the steering apparatus that are observable in the peripheral vision of the operator, the visual cue assistance system is able to communicate maneuver related information to the operator without requiring the operator to take his/her eyes off of the road. Second, unlike conventional systems which provide driving instructions to the operator such as "turn right" or "take a slight right," the visual cue assistance system provides more precise instructions to the operator through selective illumination of one or more regions of a grip of the steering apparatus. Third, through selective illumination/unillumination of the regions of the grip, the operator is easily able implement a steering angle change. Furthermore, the visual cue assistance system may not directly intervene in the driving dynamics of the vehicle (unlike certain conventional systems that provide steering apparatus torque feedback), and thus gives the operator final authority as to whether or not to implement the steering angle change. Fourth, the visual cue assistance system causes driving instructions to be displayed at the steering apparatus. As the driving instructions are displayed at an interface related to the operational level of a task (rotating the steering apparatus), the operator is able to readily understand the meaning of human machine interface (HMI) feedback.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with providing visual cues on a grip of a steering apparatus in order to communicate a difference between a current angle of the steering apparatus and a recommended angle of the steering apparatus. As a further note, this disclosure generally discusses the vehicle 100 as traveling on a roadway with surrounding vehicles, which are intended to be construed in a similar manner as the vehicle 100 itself. That is, the surrounding vehicles can include any vehicle that may be encountered on a roadway by the vehicle 100.

The vehicle 100 also includes various elements, such as a steering system 143, a navigation system 147, an advanced-driver assistance system (ADAS) 148, and a visual cue assistance system 170. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a visual cue assistance system 170 that is implemented to perform methods and other functions as disclosed herein relating to improving the conveyance of recommended steering angles to an operator of the vehicle 100. As will be discussed in greater detail subsequently, the visual cue assistance system 170, in various embodiments, is implemented partially within the vehicle 100, and as a cloud-based service. For example, in one approach, functionality associated with at least one module of the visual cue assistance system 170 is implemented within the vehicle 100 while further functionality is implemented within a cloud-based computing system.

Figure 2:
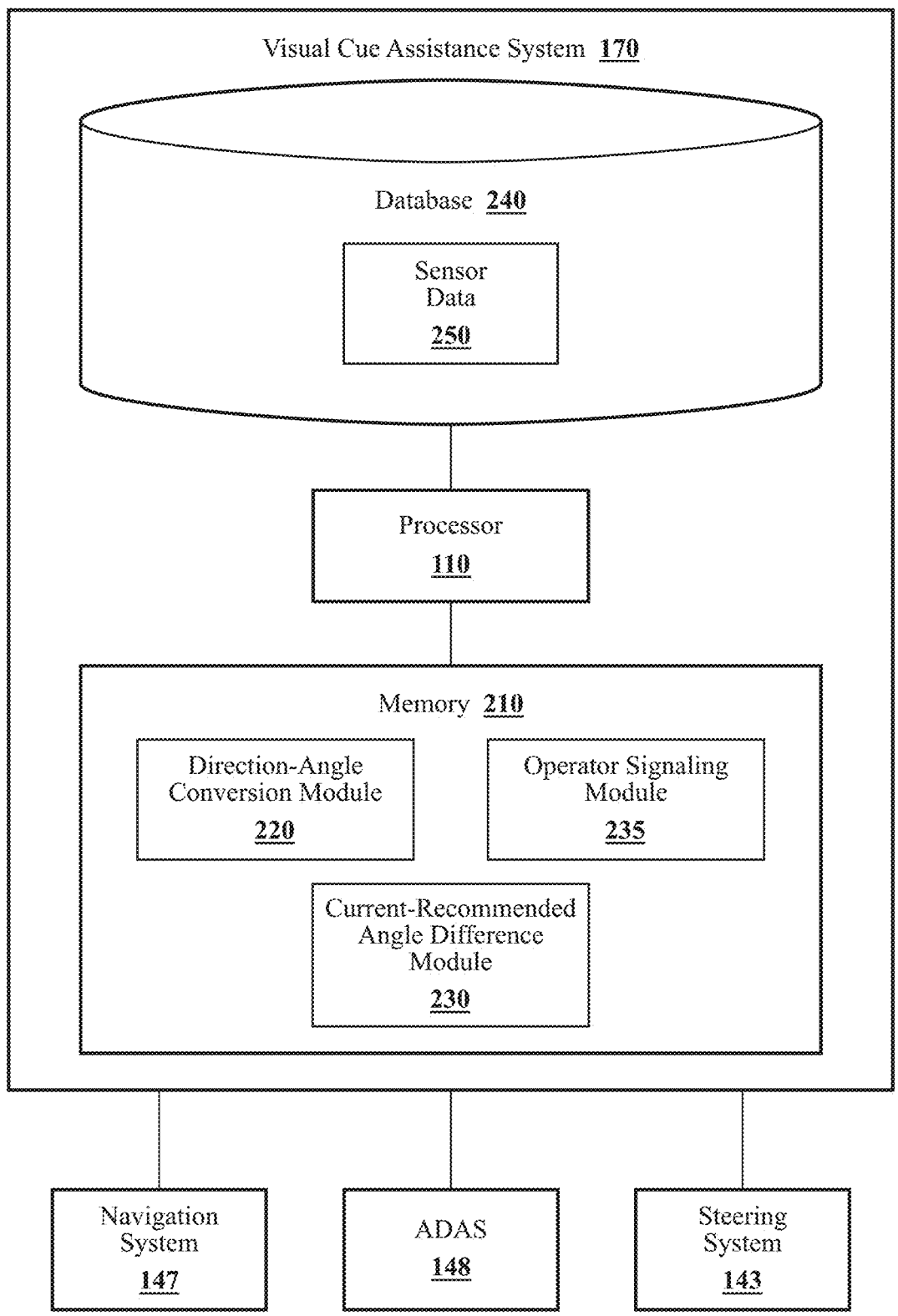
FIG. 2 illustrates one embodiment of a visual cue assistance system that is associated with providing visual cues on a grip of a steering apparatus.

With reference to FIG. 2, one embodiment of the visual cue assistance system 170 of FIG. 1 is further illustrated. The visual cue assistance system 170 is shown as including a processor 110 from the vehicle 100 of FIG. 1. Accordingly, the processor 110 may be a part of the visual cue assistance system 170, the visual cue assistance system 170 may include a separate processor from the processor 110 of the vehicle 100, or the visual cue assistance system 170 may access the processor 110 through a data bus or another communication path. In one embodiment, the visual cue assistance system 170 includes a memory 210 that stores a direction-angle conversion module 220, a current-recommended angle difference module 230, and an operator signaling module 235. The memory 210 is a random-access memory (RAM), read-only memory (ROM), a hard-disk drive, a flash memory, or other suitable memory for storing the modules 220, 230, 235. The modules 220, 230, 235 are, for example, computer-readable instructions that when executed by the processor 110 cause the processor 110 to perform the various functions disclosed herein.

The visual cue assistance system 170 as illustrated in FIG. 2 is generally an abstracted form of the visual cue assistance system 170 and may be implemented between the vehicle 100 and a cloud-computing environment.

Figure 3:
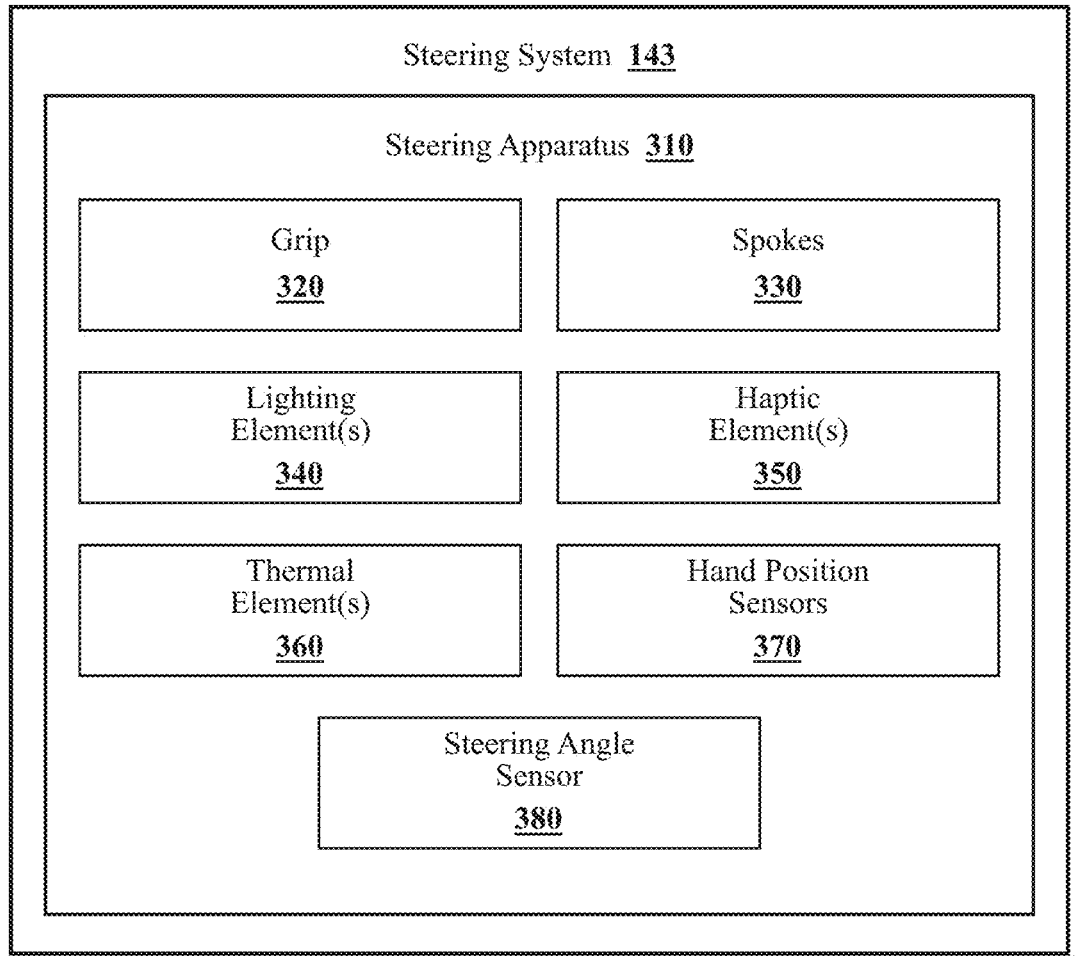
FIG. 3 illustrates one embodiment of the steering system in FIG. 1.

Referring now to FIG. 3, an example of the steering system 143 is illustrated. The steering system 143 includes a steering apparatus 310. In general, the steering apparatus 310 is configured to be operated by an operator of the vehicle 100. When the steering apparatus 310 is rotated, the steering system 143 causes a trajectory of the vehicle 100 to be altered based upon a direction and magnitude of the rotation. According to embodiments, the steering apparatus 310 is a steering wheel.

The steering apparatus 310 includes a grip 320 that is gripped by one or more hands of the operator of the vehicle 100. According to embodiments, the grip 320 is a circular or substantially circular ring. The steering apparatus 310 may include spokes 330 (e.g., one spoke, two spokes, three spokes, etc.) that connect different portions of the grip 320 to one another. Various controls may be located on the spokes 330.

According to embodiments, the steering apparatus 310 includes one or more lighting elements 340 (referred to herein as "the lighting elements 340" for ease of reading) that are configured to emit light in one or more colors and/or at one or more illumination levels (e.g., brightness levels). The lighting elements 340 may also be configured to emit light according to different patterns. According to some embodiments, the lighting elements 340 are disposed within the grip 320. According to embodiments, each of the lighting elements 340 represents an angle. According to some embodiments, the lighting elements 340 include thirty-six lighting elements that are arranged radially throughout the grip 320, where each lighting element represents a 10° angle. According to some embodiments, the lighting elements 340 are light emitting diodes (LEDs). According to embodiments, some of the lighting elements 340 may be disposed within the spokes 330 of the steering apparatus 310.

According to embodiments, the one or more lighting elements 340 are a single circular lighting element that is disposed within the grip 320. Different regions of the single circular lighting element may be selectively activated/deactivated.

According to embodiments, the lighting elements 340 are configured to emit light in different colors simultaneously. In an example, a lighting element emits light of a first color and light of a second color at the same time.

Although the lighting elements 340 are depicted in FIG. 3 as being a part of the steering apparatus 310, other possibilities are contemplated. According to embodiments, the lighting elements 340 are mounted in an interior of the vehicle 100 (other than on the steering apparatus 310). According to the embodiments, the lighting elements 340 emit light onto a region of the grip 320 of the steering apparatus 310. The light reflects off of the region of the grip 320 and is then perceived by an operator of the vehicle 100.

According to embodiments, the steering apparatus 310 includes one or more haptic elements 350 (referred to herein as "the haptic elements 350" for ease of reading). The haptic elements 350 may be disposed within the grip 320 of the steering apparatus 310. The one or more haptic elements 350 are generally configured to vibrate one or more regions of the grip 320 of the steering apparatus 310.

According to embodiments, the steering apparatus 310 includes one or more thermal elements 360 (referred to herein as "the thermal elements 360" for ease of reading). The thermal elements 360 may be disposed within the grip 320 of the steering apparatus 310. The thermal elements 360 are generally configured to heat and/or cool one or more regions of the grip 320.

The steering apparatus 310 may include one or more hand position sensors 370 (referred to herein as the "hand position sensors 370" for ease of reading). The hand positions sensors 370 are generally configured to output sensor data that is indicative of a position of one or more hands of the operator of the vehicle 100 on the grip 320. The hand positions sensors 370 may also be configured to output sensor data that indicative of a size of the one or more hands of the operator of the vehicle 100 on the grip 320. The hand positions sensors 370 may further be configured to output sensor data that is indicative of a number of hands (e.g., one or two) of the operator on the grip 320. The hand position sensors 370 may be disposed within the grip 320. According to embodiments, the hand position sensors 370 are capacitive touch sensors, force-based sensors, or optical sensors.

Although the hand position sensors 370 are depicted in FIG. 3 as being a part of the steering apparatus 310, other possibilities are contemplated. According to embodiments, the hand position sensors 370 include one or more cameras that are disposed in an interior of the vehicle 100. The one or more cameras are configured to capture an image of the one or more hands of the operator of the vehicle 100 on the grip 320. The visual cue assistance system 170 may determine a number, a size, and a position of the one or more hands of the operator on the grip 320 based upon the image.

The steering apparatus 310 further includes a steering angle sensor 380 that is configured to output sensor data that is indicative of a current angle of the steering apparatus 310. In an example, when the vehicle 100 is travelling straight, the steering angle sensor 380 outputs sensor data indicating that the current angle of the steering apparatus 310 is 0°.

With reference back to FIG. 2, the direction-angle conversion module 220 generally includes instructions that function to control the processor 110 to receive data inputs from at least one of the navigation system 147 and/or the ADAS 148. In general, the direction-angle conversion module 220 may be configured to receive a recommended direction in which the vehicle 100 is to travel from the navigation system 147 and/or the ADAS 148. Alternatively, the direction-angle conversion module 220 may be configured to receive sensor data from the sensor systems 120 and determine the recommended direction based upon the sensor data. In one example, the recommended direction is received from the navigation system 147 and enables the vehicle 100 to follow a route to a destination. In another example, the recommended direction is received from ADAS 148 and enables the vehicle 100 to avoid an obstacle on the road. In yet another example, the recommended direction is received from the ADAS 148 and enables the vehicle 100 to change lanes. In a further example, the recommended direction is received from the ADAS 148 and is part of a parking maneuver. The direction-angle conversion module 220 is also configured to convert the recommended direction into a recommended angle that the steering apparatus 310 of the vehicle 100 is to be rotated to in order for the vehicle 100 to follow the recommended direction (described in greater detail below).

The current-recommended angle difference module 230 generally includes instructions that function to control the processor 110 to receive data input from at least one of the direction-angle conversion module 220 and the steering angle sensor 380 of the steering apparatus 310. In general, the current-recommended angle difference module 230 is configured to receive sensor data that is indicative of a current angle of the steering apparatus 310 from the steering angle sensor 380 and a recommended angle of the steering apparatus 310 from at least one of the navigation system 147 and/or the ADAS 148. Alternatively, the current-recommended angle difference module 230 may receive the recommended angle from the direction-angle conversion module 220. The current-recommended angle difference module 230 is further configured to determine a difference between the current angle and the recommended angle of the steering apparatus 310. It is to be understood that the difference may be positive or negative. According to embodiments, a positive difference corresponds to clockwise rotation of the steering apparatus 310 and a negative difference corresponds to counter-clockwise rotation of the steering apparatus 310. According to other embodiments, a positive difference corresponds to counter-clockwise rotation of the steering apparatus 310 and a negative difference corresponds to clockwise rotation of the steering apparatus 310.

The operator signaling module 235 generally includes instructions that function to control the processor 110 to receive data input from the current-recommended angle difference module 230 and the hand position sensors 370. In general, the operator signaling module 235 is configured to receive the difference determined by the current-recommended angle difference module 230 and sensor data that is indicative of a position of one or more hands of the operator of the vehicle 100 on the grip 320 from the hand position sensors 370. Based upon the difference and the position of the one or more hands, the operator signaling module 235 is configured to select a region of the grip 320 of the steering apparatus 310 to illuminate. A size of the region is based upon a magnitude of the difference. For instance, when the difference is relatively large, the size of the region is relatively large. When the difference is relatively small, the size of the region is relatively small. The operator signaling module 235 is further configured to transmit a signal to the steering system 143 (or another system of the vehicle 100) which causes the region of the grip 320 to be illuminated. According to embodiments, the operator signaling module 235 is also configured to cause audible, thermal, and/or haptic notifications to be presented to the operator in order to further convey a steering angle change that may be implemented by the operator to follow a route, avoid an obstacle, etc.

In one embodiment, the direction-angle conversion module 220, the current-recommended angle difference module 230, and the operator signaling module 235, control respective sensors to provide the data inputs in the form of the sensor data 250. Additionally, while the direction-angle conversion module 220, the current-recommended angle difference module 230, and the operator signaling module 235 are discussed as controlling the various sensors to provide the sensor data 250, in one or more embodiments, the direction-angle conversion module 220, the current-recommended angle difference module 230, and the operator signaling module 235 can employ other techniques to acquire the sensor data 250 that are either active or passive. For example, the direction-angle conversion module 220, the current-recommended angle difference module 230, and the operator signaling module 235 may passively sniff the sensor data 250 from a stream of electronic information provided by the various sensors to further components within the vehicle 100. Moreover, the direction-angle conversion module 220, the current-recommended angle difference module 230, and the operator signaling module 235 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of perceptions acquired from multiple sensors.

In addition to locations of surrounding vehicles, the sensor data 250 may also include, for example, information about lane markings, and so on. Moreover, the direction-angle conversion module 220, the current-recommended angle difference module 230, and/or the operator signaling module 235, in one embodiment, control the sensors to acquire the sensor data 250 about an area that encompasses 360 degrees about the vehicle 100 in order to provide a comprehensive assessment of the surrounding environment. Of course, in alternative embodiments, the direction-angle conversion module 220, the current-recommended angle difference module 230, and the operator signaling module 235 may acquire the sensor data about a forward direction alone when, for example, the vehicle 100 is not equipped with further sensors to include additional regions about the vehicle 100 and/or the additional regions are not scanned due to other reasons (e.g., unnecessary due to known current conditions).

Moreover, in one embodiment, the visual cue assistance system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220, 230, and 235 in executing various functions. In one embodiment, the database 240 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on.

Example operation of the visual cue assistance system 170 is now set forth. It is contemplated that the vehicle 100 is navigating about an environment while being operated by an operator gripping the grip 320 of the steering apparatus 310. The visual cue assistance system 170 may obtain a recommended direction for the vehicle 100 to travel in from at least one of the navigation system 147 and/or the ADAS 148. Alternatively, the visual cue assistance system 170 may determine the recommended direction based upon sensor data output by the sensor systems 120. The visual cue assistance system 170 may be part of the navigation system 147 and/or the ADAS 148. As noted previously, the recommended direction may be a direction for the vehicle 100 to follow a travel route to a particular destination, a direction to avoid an obstacle in the environment of the vehicle 100, a direction to change lanes, a direction to complete a parking maneuver (e.g., parallel parking), etc. The visual cue assistance system 170, via the direction-angle conversion module 220, converts the recommended direction into a recommended angle of the steering apparatus 310. When the steering apparatus 310 is rotated to the recommended angle by the operator of the vehicle 100, the vehicle 100 travels in the recommended direction. According to embodiments, the visual cue assistance system 170 receives the recommended angle from at least one of the navigation system 147 and/or the ADAS 148 directly, that is the navigation system 147 and/or the ADAS 148 determine the recommended angle and provide the recommended angle to the visual cue assistance system 170.

The visual cue assistance system 170, via the current-recommended angle difference module 230, determines a current angle of the steering apparatus 310 based upon sensor data output from the steering angle sensor 380. The visual cue assistance system 170, via the current-recommended angle difference module 230, receives the recommended angle of the steering apparatus 310 from the direction-angle conversion module 220. The visual cue assistance system 170, via the current-recommended angle difference module 230, determines a difference between the current angle and the recommended angle. The difference is indicative of a rotation of the steering apparatus 310 that is required to change direction of the vehicle 100 from a current direction to the recommended direction. In an example, when the current angle is 0° and the recommended angle is 45°, the difference is 45°. In another example, when the current angle is 10° and the recommended angle is 45°, the difference is 35°. In yet another example, when the current angle is 0° and the recommended angle is −20°, the difference is −20°.

The visual cue assistance system 170, via the operator signaling module 235, determines a position of one or more hands of the operator on the grip 320 of the steering apparatus 310 based upon sensor data output from the hand position sensors 370. In an example, the visual cue assistance system 170, via the operator signaling module 235, determines a first position of a first hand (e.g., a left hand) of the operator on the grip 320 and a second position of a second hand (e.g., a right hand) of the operator on the grip 320 based upon the sensor data.

The visual cue assistance system 170, via the operator signaling module 235, selects a region of the grip 320 to illuminate based upon the difference and the position of the one or more hands of the operator on the grip 320. The region may be located proximate to (e.g., next to) the one or more hands of the operator on the grip 320. A size of the region is indicative of the difference determined by the current-recommended angle difference module 230. An orientation of the region with respect to a hand of the operator is indicative of a direction in which the steering apparatus 310 is to be rotated in order for the steering apparatus 310 to be oriented at the recommended angle. The visual cue assistance system 170, via the operator signaling module 235, may also select the region additionally based upon a size of the hand the operator. In an example where the difference is (+) 30°, the region is a 30° arc on the grip 320 that extends clockwise from a position of the hand on the grip 320. In another example where the difference is (−) 40°, the region is a 40° arc on the grip 320 that extends counterclockwise from the position of the hand on the grip 320. The visual cue assistance system 170, via the operator signaling module 235, causes the region to be illuminated in order to visually inform the operator of the difference (described in greater detail below).

As the steering apparatus 310 is rotated from the current angle to the recommended angle, the visual cue assistance system 170, via the operator signaling module 235, unilluminates the region. In an example, as a current angle of the steering apparatus 310 approaches the recommended angle due to the steering apparatus 310 being rotated, a magnitude of the difference decreases. As such, a size of the (illuminated) region decreases as the difference approaches the recommended angle. When the size of the region is zero (i.e., the grip of the steering apparatus 310 is not illuminated), the current angle is the recommended angle, and the vehicle 100 is travelling in the recommended direction.

According to embodiments, the grip 320 has a plurality of lighting elements (e.g., the lighting elements 340) disposed radially therein, where each lighting element represents an angle. The visual cue assistance system 170, via the operator signaling module 235, selects a subset of lighting elements of the plurality of lighting elements based upon the difference and the position of the hand of the operator, where the subset of lighting elements corresponds to the region. In an example, the subset of lighting elements are located proximate to the hand of the operator on the grip 320. For instance, the subset of lighting elements may include a first lighting element located proximate to the hand of the operator on the grip 320 and a second lighting element located proximate to the first lighting element. The visual cue assistance system 170 illuminates the subset of lighting elements to indicate the difference. For instance, the visual cue assistance system 170 illuminates the first lighting element and the second lighting element. Likewise, as the steering apparatus 310 is rotated from the current angle to an intermediate angle between the current angle and the recommended angle, the visual cue assistance system 170, via the operator signaling module 235, unilluminates the second lighting element. As the steering apparatus 310 is rotated from the intermediate angle to the recommended angle, the visual cue assistance system 170, via the operator signaling module 235, unilluminates the first lighting element. When no lighting elements are illuminated, the operator of the vehicle 100 is able to understand that the current angle of the steering apparatus 310 matches the recommended angle.

It is to be understood that the visual cue assistance system 170 may illuminate the region in different colors and/or with different illumination levels (e.g., brightness). According to embodiments, when the difference (determined by the current-recommended angle difference module 230) is relatively large, the region is illuminated at a first brightness, whereas when the difference is relatively small, the region is illuminated at a second brightness. According to embodiments, when the difference is relatively large, the region is illuminated in a first color (e.g., red), whereas when the difference is relatively small, the region is illuminated in a second color (e.g., green).

According to embodiments, the visual cue assistance system 170 receives a classification from one or more of the navigation system 147 and/or the ADAS 148 along with the recommended direction, where the classification is indicative of a purpose of the recommended direction. Alternatively, the visual cue assistance system 170 may classify the recommended direction. Example classifications include route following, obstacle avoidance, lane changes, and parking maneuvers. According to the embodiments, the visual cue assistance system 170 selects a color (and/or a brightness) based upon the classification and causes the region to be illuminated in the color (and/or at the brightness) based upon the classification (and the difference). In an example, the visual cue assistance system 170 illuminates the region on the grip 320 of the steering apparatus 310 in a first color (and/or at a first brightness) when the recommended angle of the steering apparatus 310 corresponds to route following and the visual cue assistance system 170 illuminates the region on grip 320 of the steering apparatus 310 in a second color (and/or at a second brightness) when the recommended angle of the steering apparatus 310 corresponds to avoiding an obstacle in an environment of the vehicle 100.

According to embodiments, the visual cue assistance system 170, via the operator signaling module 235, illuminates the region in a pattern to indicate a rotational direction of the steering apparatus 310. In an example, the region comprises a first lighting element disposed within the grip 320 located proximate to a hand of the operator and a second lighting element disposed within the grip 320 located proximate to the first lighting element. In the example, the visual cue assistance system 170, via the operator signaling module 235, illuminates the first lighting element at a first time and the second lighting element at a second time, where the second time occurs after the first time. In this manner, the visual cue assistance system 170 is able to provide a "pulsing" pattern to indicate a direction of rotation (clockwise in the above-described example) of the steering apparatus 310.

According to embodiments, the vehicle 100 includes an ambient illumination sensor that is configured to output sensor data that is indicative of an ambient illumination level within an interior of the vehicle 100. According to the embodiments, the visual cue assistance system 170 determines the ambient illumination level based upon the sensor data. According to the embodiments, an illumination level of the region (selected by the operator signaling module 235) is based upon the ambient illumination level. For instance, the visual cue assistance system 170 varies one or more of a color or intensity of the (illuminated) region of the grip 320 based upon the ambient illumination level. In this manner, the visual cue assistance system 170 is able to provide visual cues that are readily perceived by the operator of the vehicle 100.

According to embodiments, the steering apparatus 310 comprises a first half and a second half, where the first half (e.g., a lower half) is located proximate to a lap of the operator of the vehicle 100 and the second half (e.g., an upper half) is located proximate to the first half and proximate to a roof of the vehicle 100. Stated differently, a horizontal plane bisects the steering apparatus 310 at a diameter of the steering apparatus 310 and defines the first half and the second half of the steering apparatus 310. According to the embodiments, the operator of the vehicle 100 grips the steering apparatus 310 on the first half (e.g., the lower half). As such, it may be difficult for the operator to perceive the grip 320 of the first half being illuminated due to proximity of the first half to the lap of the operator (and due to the first half being located relatively far from a gaze of the operator in comparison to the first half). According to the embodiments, the visual cue assistance system 170, via the operator signaling module 235, determines whether one or more hands of the operator are positioned on the first half of the steering apparatus 310. Upon positive determination, the visual cue assistance system 170, via the operator signaling module 235, selects a region in the second half of the grip 320 of the steering apparatus 310 and illuminates the region in the second half of the grip 320 based upon the difference such that the operator is able to perceive the illuminated region. As the steering apparatus 310 is rotated from the current angle to the recommended angle, the visual cue assistance system 170, via the operator signaling module 235, unilluminates the region in the second half of the grip.

It is to be understood that a recommended driving angle may require the steering apparatus 310 to be rotated more than 360°. According to embodiments, the visual cue assistance system 170 illuminates lighting elements corresponding to rotations of less than 360° in a first color and lighting elements corresponding to rotations of greater than 360° in a second color.

According to embodiments, the visual cue assistance system 170 illuminates a first region and a second region on the grip 320 of the steering apparatus 310, where the first region corresponds to a first hand of the operator and a second region corresponds to a second hand of the operator. In an example, the first region is located proximate to the first hand of the operator on the grip 320 and the second region is located proximate to the second hand of the operator on the grip 320. A size of the first region and a second of the second region is based upon the difference determined by the current-recommended angle difference module 230.

It is to be understood that an operator of the vehicle 100 may place both hands on the grip 320 of the steering apparatus 310. It is also to be understood that in certain scenarios, the difference between the current angle and the recommended angle may exceed an angular difference between a first hand and a second hand on the grip 320 (as measured from a central point of the steering apparatus 310). As such, the first region and the second region (determined by the operator signaling module 235) on the grip 320 may overlap. According to embodiments, the visual cue assistance system 170 illuminates a single region on the grip 320 when the difference exceeds the angular difference between the first hand and the second hand. In one example, the visual cue assistance system 170 illuminates a region proximate to a right hand of the operator when the difference is positive and illuminates a region proximate to a left hand of the operator when the difference is negative. According to other embodiments, the visual cue assistance system 170 illuminates the first region in a first color, the second region in a second color, and a region that overlaps the first region and the second region in a third color. As the steering apparatus 310 is rotated towards the recommended angle, the visual cue assistance system 170 may change a color of the region overlapping the first region and the second region from the third color to the first color or the second color (depending on direction of rotation) such that the operator is able to understand that further rotation of the steering apparatus 310 is necessary in order to achieve the recommended steering angle.

It is to be understood that the visual cue assistance system 170 may react dynamically to a change in position of one or more hands of the operator on the grip 320 of the steering apparatus 310. For instance, according to embodiments, if the operator moves a hand while rotating the steering apparatus 310, the visual cue assistance system 170 may dynamically determine a new region that is to be illuminated based upon a new position of the hand and illuminate the new region.

Although the visual cue assistance system 170 has been described above as providing visual cues on the steering apparatus 310, additional possibilities are contemplated. According to some embodiments, the visual cue assistance system 170 may additionally cause a sound to be output from a speaker of the vehicle 100, where at least one of a magnitude or frequency of the sound is based upon the difference (determined by the current-recommended angle difference module 230). According to some embodiments, a location of the sound may be based upon a sign of the difference. For instance, when the difference is negative, the visual cue assistance system 170 outputs the sound from a first speaker on a first side (e.g., left) of the vehicle 100, and when the difference is positive, the visual cue assistance system 170 outputs the sound from a second speaker on a second side (e.g., right) of the vehicle 100.

According to some embodiments, the visual cue assistance system 170 may additionally cause the steering apparatus 310 to vibrate (via the haptic elements 350), where at least one of a magnitude and/or frequency of the vibration is based upon the difference (determined by the current-recommended angle difference module 230). According to some embodiments, the visual cue assistance system 170 may additionally cause the steering apparatus 310 to vibrate (via the haptic elements 350), where a location of the vibration on the steering apparatus 310 is based upon a sign of the difference.

According to some embodiments, the visual cue assistance system 170 may additionally cause the steering apparatus 310 to change a temperature of the grip 320 of the steering apparatus 310 (via the thermal elements 360), where a magnitude of the temperature change is based upon the difference determined by the current-recommended angle difference module 230.

According to embodiments, a portion of the lighting elements 340 are located in areas other than the grip 320 of the steering apparatus 310, such as in the spokes 330 of the steering apparatus 310. According to the embodiments, the visual cue assistance system 170 illuminates and/or unilluminates the portion of the lighting elements 340 to convey the difference (determined by the current-recommended angle difference module 230) to the operator of the vehicle 100.

Although the visual cue assistance system 170 has been described above as illuminating a region of the grip 320 of the steering apparatus 310 based upon a difference between a current angle and a recommended angle of the steering apparatus 310 and unilluminating the region as the steering apparatus 310 is rotated from the current angle to the recommended angle, other possibilities are contemplated. According to embodiments, all or substantially all of the grip 320 of the steering apparatus 310 is illuminated when the difference between the current angle and the recommended angle is zero. According to the embodiments, the visual cue assistance system 170 unilluminates the region of the grip 320 of the steering apparatus 310 based upon the difference between the current angle and the recommended angle and illuminates the region as the steering apparatus 310 is rotated from the current angle to the recommended angle.

According to some embodiments, the visual cue assistance system 170 is a computing system that is comprised by the vehicle 100. According to other embodiments, some functionality of the visual cue assistance system 170 is provided to the vehicle 100 by a cloud-based computing environment.

With reference now to FIGS. 4A-E, operation of the visual cue assistance system 170 according to an embodiment is now set forth. In the example depicted in FIGS. 4A-E, a current angle 402 of the steering apparatus 310 is represented by a solid circle and a recommend angle 404 of the steering apparatus 310 is represented by an arrow.

Figure 4A:
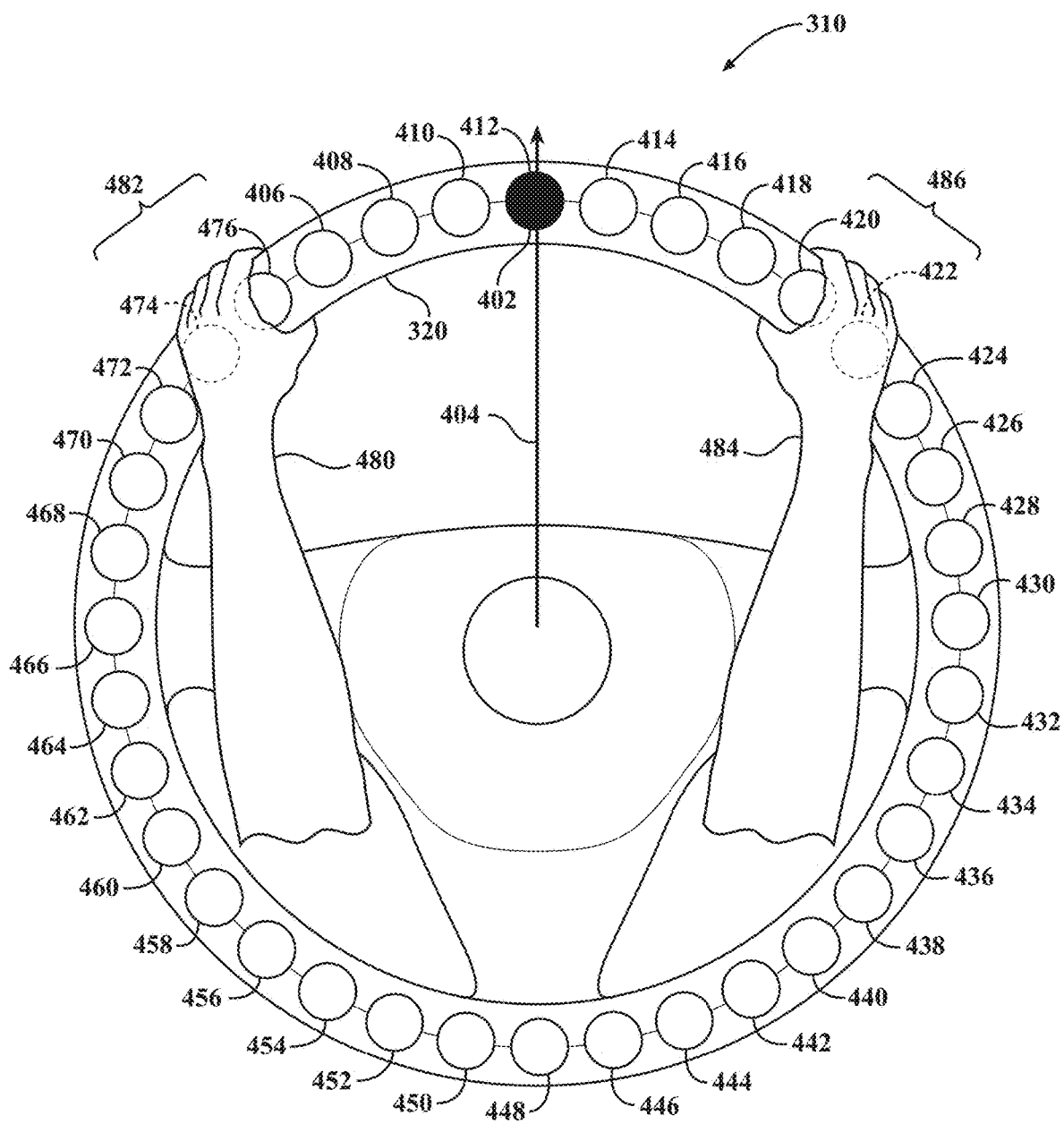
FIGS. 4A-E illustrate sequential views of providing visual cues on a grip of a steering apparatus.

Referring specifically now to FIG. 4A, an example of the steering apparatus 310 is illustrated. As depicted in FIG. 4A, the current angle 402 and the recommended angle 404 are the same (e.g., 0°). The grip 320 of the steering apparatus 310 has a plurality of lighting elements 406-476 disposed radially therein, where each of the plurality of lighting elements 406-476 represents an angle. In the example depicted in FIG. 4A, each of the plurality of lighting elements 406-476 represents 10°. As such, the plurality of lighting elements 406-476 represent 360°. A first hand 480

(e.g., left hand) of the operator is located at a first position 482 on the grip 320 and a second hand 484 (e.g., right hand) of the operator is located at a second position 486 on the grip 320.

Figure 4B:
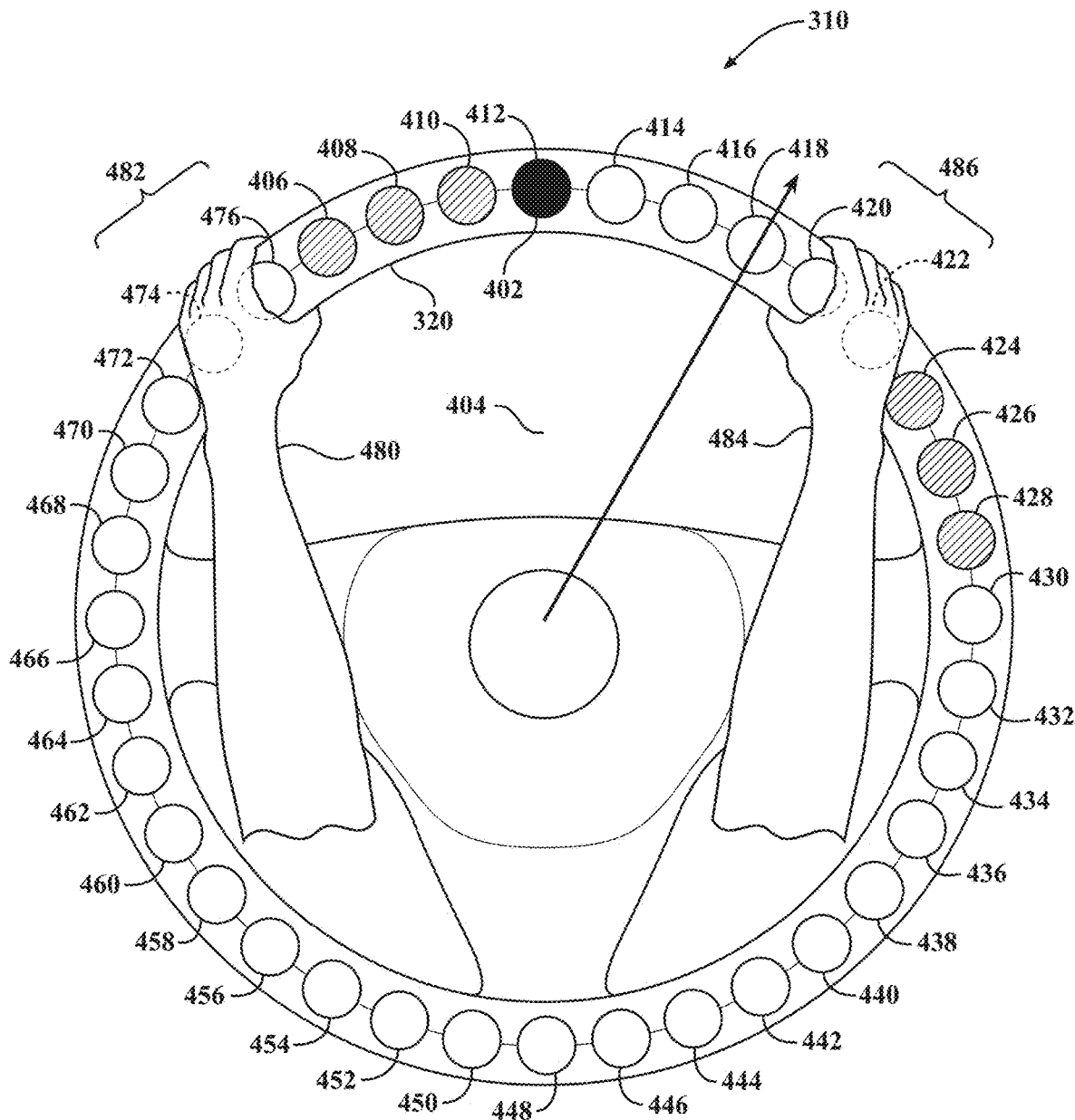

Referring now to FIG. 4B, the visual cue assistance system 170, using the above-described processes, determines that a difference exists between the current angle 402 and the recommended angle 404. For instance, the arrow representing the recommended angle 404 is at a different orientation than the orientation in FIG. 4A. In the example depicted in FIG. 4B, the difference is (+) 30°. The visual cue assistance system 170 determines that the first hand 480 is located at the first position 482 and that the second hand 484 is located at the second position 486 based upon sensor data output by the hand position sensors 370. The first position 482 corresponds to lighting elements 474-476 and the second position 486 corresponds to lighting elements 420-422. Stated differently, the first hand 480 on the grip 320 covers the lighting elements 474-476 and the second hand 484 covers the lighting elements 420-422. The visual cue assistance system 170 determines that the first hand 480 covers the lighting elements 474-476 and that the second hand 484 covers the lighting elements 420-422 based upon the sensor data output by the hand position sensors 370.

The visual cue assistance system 170 selects a first region and a second region on the grip 320 to illuminate based upon the difference and the first position 482 of the first hand 480 and the second position 486 of the second hand 484. In the example depicted in FIG. 4B in which the difference is (+) 30°, the visual cue assistance system 170 selects a first lighting element 406, a second lighting element 408, and a third lighting element 410 to comprise the first region. The visual cue assistance system 170 also selects a fourth lighting element 424, a fifth lighting element 426, and a sixth lighting element 428 to comprise the second region. The visual cue assistance system 170 transmits a first signal to the steering system 143 which causes the first lighting element 406, the second lighting element 408, and the third lighting element 410 to illuminate and a second signal to the steering system 143 which causes the fourth lighting element 424, the fifth lighting element 426, and the sixth lighting element 428 to illuminate (illustrated in FIG. 4B by cross-hatching). In the example depicted in FIG. 4B, the visual cue assistance system 170 does not illuminate the lighting elements 474-476 or the lighting elements 420-422 as such elements are covered by the first hand 480 and the second hand 484 of the operator, respectively.

Figure 4C:
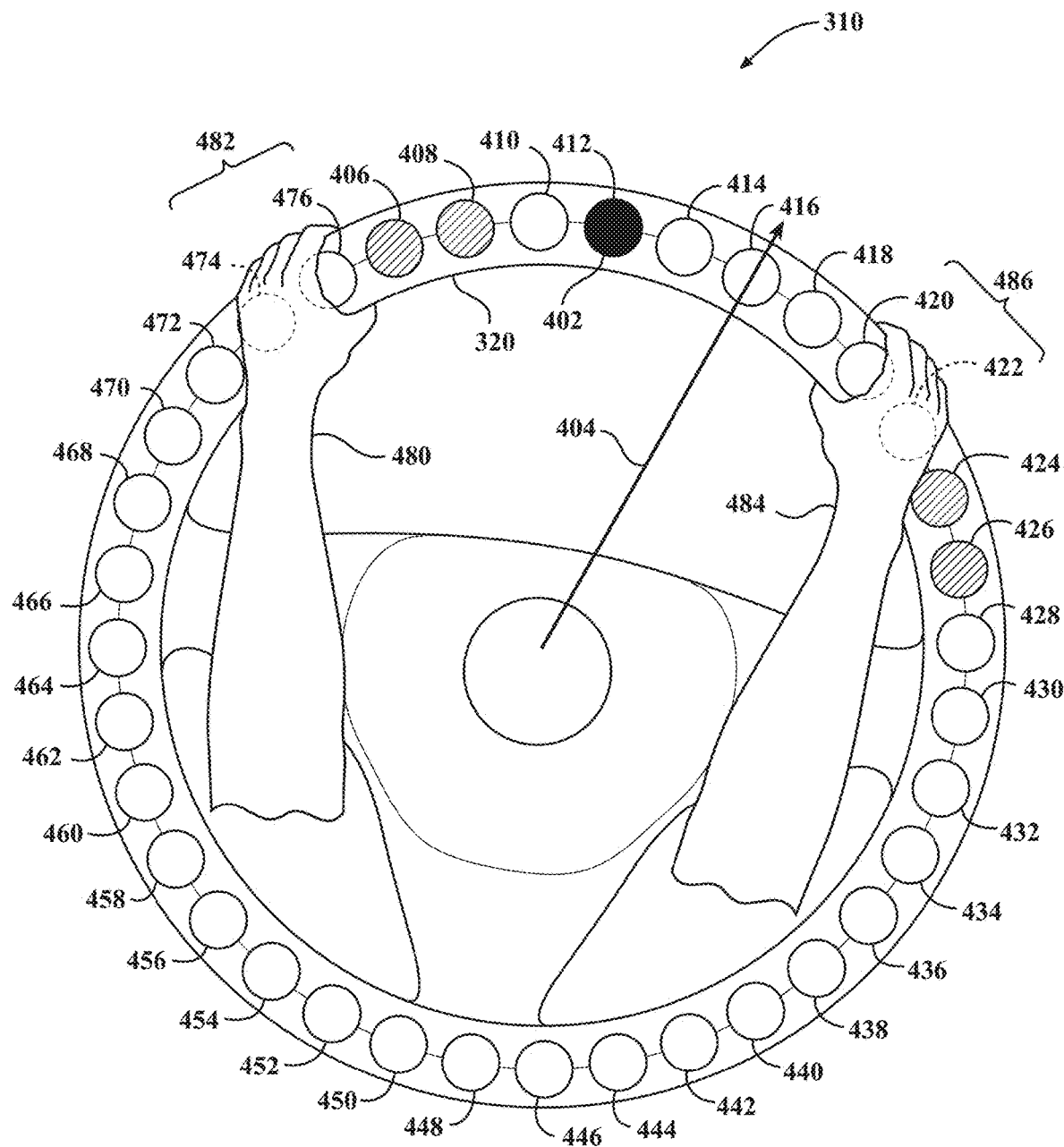

Referring now to FIG. 4C, the steering apparatus 310 is rotated by the operator (+) 10° from the position illustrated in FIG. 4B. The difference between the current angle 402 of the steering apparatus 310 and the recommended angle 404 of the steering apparatus 310 is now 20°. As such, the visual cue assistance system 170 unilluminates (e.g., deactivates) the third lighting element 410 and the sixth lighting element 428 to visually inform the operator that the steering apparatus 310 has been rotated 10° towards the recommended angle 404.

Figure 4D:
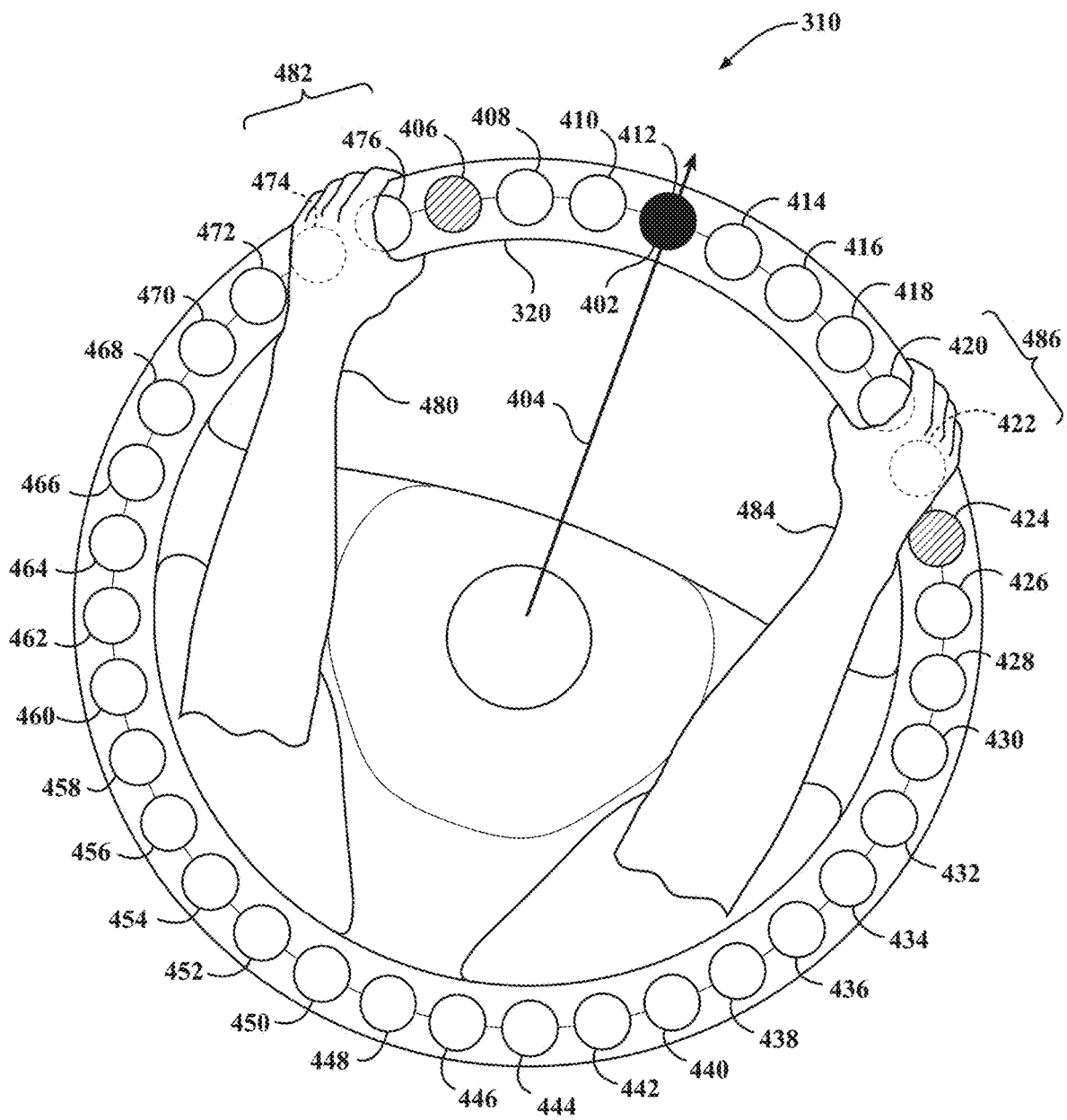

Turning now to FIG. 4D, the steering apparatus 310 is rotated by the operator (+) 10° from the position illustrated in FIG. 4C. The difference between the current angle 402 of the steering apparatus 310 and the recommended angle 404 of the steering apparatus 310 is now 10°. As such, the visual cue assistance system 170 unilluminates (e.g., deactivates) the second lighting element 408 and the fifth lighting element 426 to visually inform the operator that the steering apparatus 310 has been rotated 10° towards the recommended angle 404.

Figure 4E:
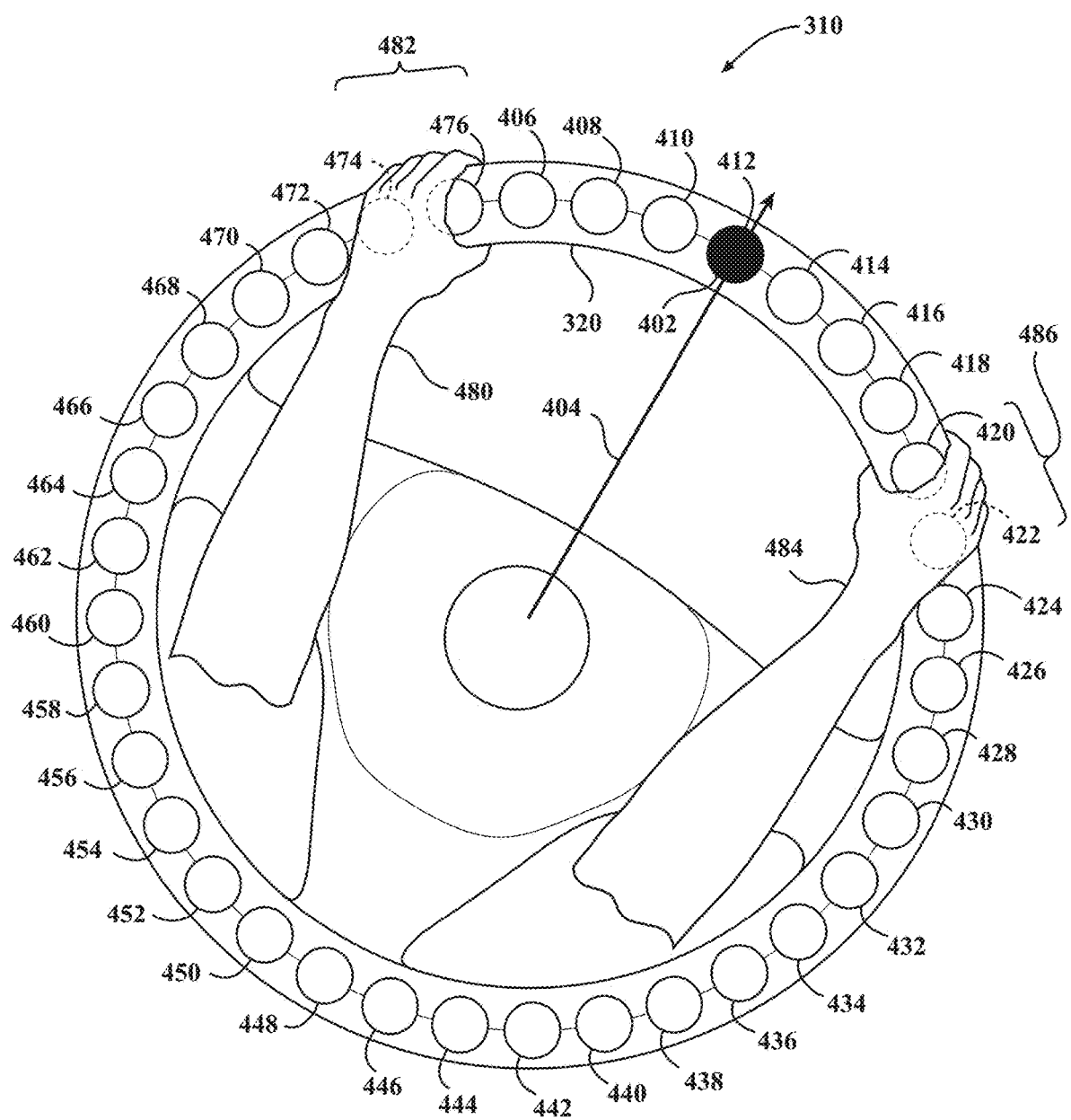

Referring now to FIG. 4E, the steering apparatus 310 is rotated by the operator (+) 10° from the position illustrated in FIG. 4E. The difference between the current angle 402 of the steering apparatus 310 and the recommended angle 404 of the steering apparatus 310 is now 0°. As such, the visual cue assistance system 170 unilluminates (e.g., deactivates) the first lighting element 406 and the fourth lighting element 424 to visually inform the operator that the steering apparatus 310 has been rotated 10° towards the recommended angle. As none of the plurality of lighting elements 406-476 are currently illuminated, the operator of the vehicle 100 may be informed that the current angle 402 of the steering apparatus 310 is the same as the recommended angle 404 of the steering apparatus 310.

Figure 5:
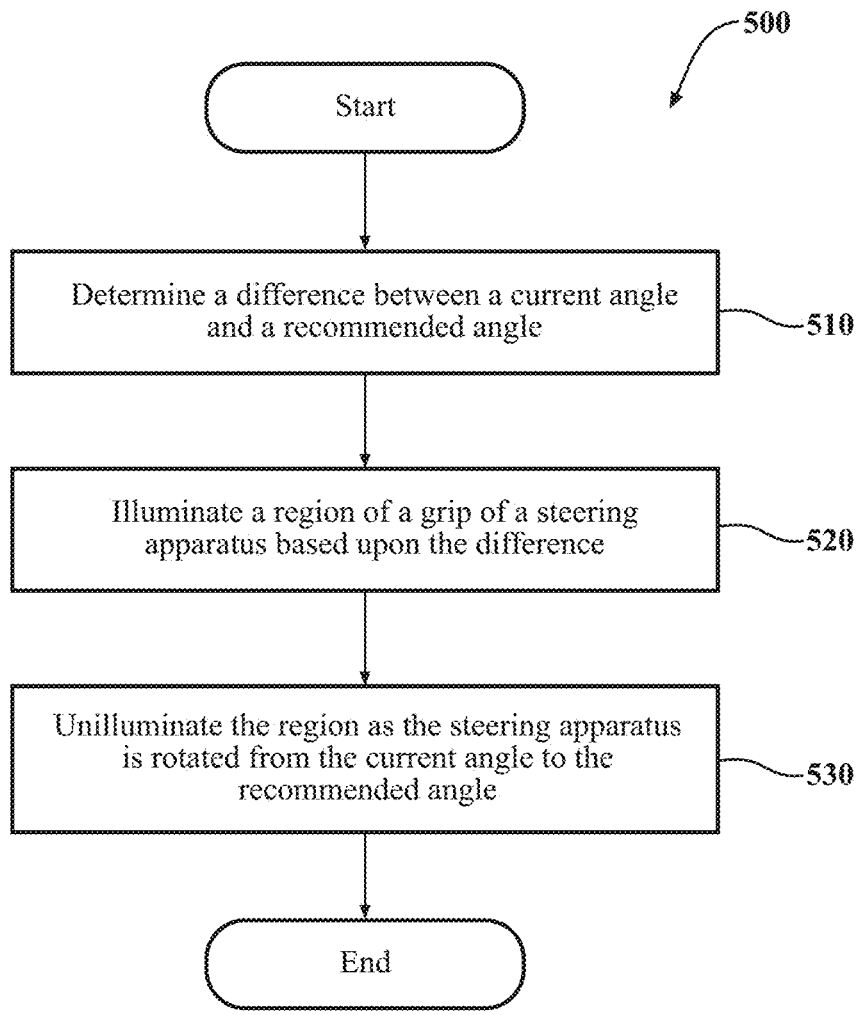
FIG. 5 illustrates one embodiment of a method that is associated with providing visual cues on a grip of a steering apparatus.

Additional aspects of the visual cue assistance system 170 will be discussed in relation to FIG. 5. FIG. 5 illustrates a flowchart of a method 400 that is associated with providing visual cues on the steering apparatus 310 of the vehicle 100. The method 500 will be discussed from the perspective of the visual cue assistance system 170 of FIGS. 1, and 2. While the method 500 is discussed in combination with the visual cue assistance system 170, it should be appreciated that the method 500 is not limited to being implemented within the visual cue assistance system 170 but is instead one example of a system that may implement the method 500.

At 510, the visual cue assistance system 170 determines a difference between a current angle of the steering apparatus 310 of the vehicle 100 and a recommended angle of the steering apparatus 310. For instance, as discussed above, the visual cue assistance system 170 may determine a current angle of the steering apparatus 310 based upon sensor data output from the steering angle sensor 380. Furthermore, the visual cue assistance system 170 may obtain a recommended angle of the steering apparatus 310 from the navigation system 147, the ADAS 148, or the visual cue assistance system 170 may determine the recommended angle based upon sensor data output by the sensor systems 120. The recommended angle may enable the vehicle 100 to follow a route to a destination, enable the vehicle 100 to a avoid a collision with an object, or enable the vehicle 100 to perform a maneuver, such as a parking maneuver.

At 520, the visual cue assistance system 170 illuminates a region of the grip 320 of the steering apparatus 310 based upon the difference and a position of a hand of an operator of the vehicle 100 on the grip 320. For instance, as described above, the visual cue assistance system 170 may determine the position of the hand based upon sensor data output from the hand position sensors 370. According to embodiments, the visual cue assistance system 170 selects the region to be proximate to the hand of the operator. A size of the region is based upon a magnitude of the difference. As described above, illuminating the region may comprise activating lighting elements disposed within the region of the grip 320.

At 530, the visual cue assistance system 170 unilluminates the region of the grip 320 of the steering apparatus 310 as the steering apparatus 310 is rotated from the current angle to the recommended angle. As described above, unilluminating the region may comprise progressively deactivating the (previously activated) lighting elements disposed within the region of the grip 320 as the steering apparatus 310 is rotated from the current angle to the recommended angle.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

As noted above, the vehicle 100 can include the sensor system(s) 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.). The output system 135 may be or include an audio system that includes a speaker, a haptic system that vibrates a steering apparatus and/or a seat of the vehicle 100, a thermal system that changes a temperature of the steering apparatus and/or a seat of the vehicle 100, and/or a display system that displays visual information on at least one of the steering apparatus, a window, a windshield, a dashboard, a center console, A-pillars, etc.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

According to embodiments, the vehicle systems 140 include advanced driver-assistance systems (ADAS) 148. The ADAS 148 includes one or more of adaptive cruise control (ACC), an anti-lock braking system (ABS), an automotive night vision system, a backup camera, a blind spot monitor, a collision avoidance system, a crosswind stabilization system, cruise control, an electronic stability control (ESC) system, a forward collision warning (FCW) system, an intersection assistant system, an intelligent speed adaptation system, a lane centering system, a lane departure warning system (LDW), a lane change assistance system, parking sensors, a pedestrian protection system, rain sensors, tire pressure monitoring, a traction control system, a traffic sign recognition system, and/or a wrong-way driving warning.

The processor(s) 110 and/or the visual cue assistance system 170 can be operatively connected to communicate with the various vehicle systems 140 and/or individual components thereof. For example, returning to FIG. 1, the processor(s) can be in communication to send and/or receive information from the various vehicle systems 140 to control the movement, speed, maneuvering, heading, direction, etc. of the vehicle 100. The processor(s) 110 and/or the visual cue assistance system 170 may control some or all of these vehicle systems 140 and, thus, may be partially or fully autonomous.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A computing system for providing visual cues on a steering apparatus of a vehicle, the computing system comprising:
    a processor; and
    memory communicably coupled to the processor and storing instructions that, when executed by the processor, cause the processor to:
        determine a difference between a current angle of the steering apparatus and a recommended angle of the steering apparatus;
        illuminate a region of a grip of the steering apparatus based upon the difference, wherein the region is located proximate to a hand of an operator of the vehicle on the grip; and
        unilluminate the region as the steering apparatus is rotated from the current angle to the recommended angle.

2. The computing system of claim 1, wherein the instructions further cause the processor to:
    obtain sensor data from a sensor of the vehicle, wherein the sensor data is indicative of an environment around the vehicle;
    determine a recommended direction based upon the sensor data; and
    convert the recommended direction into the recommended angle.

3. The computing system of claim 2, wherein the sensor data comprises at least one of:
    radar data;
    lidar data;
    sonar data; or
    camera images.

4. The computing system of claim 1, wherein the recommended angle is determined by a navigation system of the vehicle.

5. The computing system of claim 1, wherein the recommended angle is determined by advanced-driver assistance systems (ADAS) of the vehicle.

6. The computing system of claim 1, wherein the hand of the operator comprises a first hand and a second hand, wherein the region of the grip comprises a first region located proximate to the first hand and a second region located proximate to the second hand, wherein the first region includes a first lighting element and the second region includes a second lighting element, wherein the first lighting element and the second lighting element are illuminated based upon the difference, and wherein the first lighting element and the second lighting element are unilluminated as the steering apparatus is rotated from the current angle to the recommended angle.

7. The computing system of claim 1, wherein the vehicle comprises the computing system.

8. The computing system of claim 1, wherein the instructions further cause the processor to:
    determine a position of the hand on the grip of the steering apparatus based upon sensor data output by a sensor of the vehicle; and
    select the region based upon the position of the hand.

9. A non-transitory computer-readable medium for providing visual cues on a steering apparatus of a vehicle and including instructions that, when executed by a processor, cause the processor to:
    determine a difference between a current angle of the steering apparatus of the vehicle and a recommended angle of the steering apparatus;

illuminate a region of a grip of the steering apparatus based upon the difference, wherein the region is located proximate to a hand of an operator of the vehicle on the grip; and unilluminate the region as the steering apparatus is rotated from the current angle to the recommended angle.

10. The non-transitory computer-readable medium of claim 9, wherein the region of the grip comprises a first lighting element located proximate to the hand and a second lighting element located proximate to the first lighting element, and wherein the first lighting element is illuminated at a first time and the second lighting element is illuminated at a second time occurring after the first time to indicate a direction in which to rotate the steering apparatus.

11. The non-transitory computer-readable medium of claim 9, wherein the region of the grip comprises a first lighting element located proximate to the hand and a second lighting element located proximate to the first lighting element, wherein the first lighting element and the second lighting element are illuminated to indicate the difference, wherein the second lighting element is unilluminated when the steering apparatus is rotated from the current angle to an intermediate angle between the current angle and the recommended angle, and wherein the first lighting element is unilluminated when the steering apparatus is rotated from the intermediate angle to the recommended angle.

12. The non-transitory computer-readable medium of claim 9, wherein the instructions further cause the processor to:

output a sound from a speaker of the vehicle, wherein at least one of a magnitude or a frequency of the sound is based upon the difference.

13. The non-transitory computer-readable medium of claim 9, wherein the instructions further cause the processor to:

vibrate the steering apparatus, wherein at least one of a magnitude or a frequency of vibration is based upon the difference.

14. A method comprising:

determining a difference between a current angle of a steering apparatus of a vehicle and a recommended angle of the steering apparatus;

illuminating a region of a grip of the steering apparatus based upon the difference and a position of a hand of an operator of the vehicle on the grip; and unilluminating the region as the steering apparatus is rotated from the current angle to the recommended angle.

15. The method of claim 14, further comprising:

causing a temperature change in the grip of the steering apparatus, wherein a magnitude of the temperature change is based upon the difference.

16. The method of claim 14, wherein an orientation of the region with respect to the hand is indicative of a direction in which the steering apparatus is to be rotated.

17. The method of claim 14, wherein the region of the grip is illuminated in a color, wherein the color is based upon a magnitude of the difference.

18. The method of claim 14, further comprising:

determining the position of the hand of the operator on the grip based upon sensor data output by a sensor; and selecting the region based upon the position of the hand and the difference.

19. The method of claim 14, further comprising:

determining an ambient illumination level within an interior of the vehicle based upon sensor data output by a sensor of the vehicle, wherein an illumination level of the region is based upon the ambient illumination level.

20. The method of claim 14, wherein the steering apparatus is a steering wheel, wherein lighting elements are disposed radially within the grip, and wherein illuminating the region comprises activating a subset of the lighting elements located in the region.

* * * * *